(12) United States Patent
Tebakari

(10) Patent No.: US 8,017,099 B2
(45) Date of Patent: Sep. 13, 2011

(54) METHOD FOR PRODUCING POLYCRYSTALLINE SILICON, AND FACILITY FOR PRODUCING POLYCRYSTALLINE SILICON

(75) Inventor: Masayuki Tebakari, Saitama (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 12/308,365

(22) PCT Filed: Oct. 26, 2007

(86) PCT No.: PCT/JP2007/070943
§ 371 (c)(1),
(2), (4) Date: Dec. 12, 2008

(87) PCT Pub. No.: WO2008/059706
PCT Pub. Date: May 22, 2008

(65) Prior Publication Data
US 2010/0160591 A1    Jun. 24, 2010

(30) Foreign Application Priority Data

Nov. 14, 2006  (JP) .................. 2006-308477
Oct. 22, 2007  (JP) .................. 2007-273546

(51) Int. Cl.
*C01B 33/02* (2006.01)
(52) U.S. Cl. ........ 423/348; 528/481; 528/490; 528/501; 423/342; 423/350; 427/573; 422/236; 422/245.1; 422/305; 422/306; 422/307
(58) Field of Classification Search ............ 528/10
See application file for complete search history.

(56) References Cited

U.S. PATENT DOCUMENTS

| 2,606,811 | A | | 8/1952 | Wagner et al. |
| 4,217,334 | A | * | 8/1980 | Weigert et al. ............. 423/342 |
| 4,340,574 | A | * | 7/1982 | Coleman .................... 423/347 |
| 4,396,824 | A | * | 8/1983 | Fiegl et al. .................. 392/480 |
| 4,921,026 | A | * | 5/1990 | Flagella et al. ............. 148/33 |
| 6,447,850 | B1 | * | 9/2002 | Ebe et al. ................... 427/573 |
| 6,846,473 | B2 | * | 1/2005 | Kirii et al. .................. 423/342 |
| 2002/0187096 | A1 | * | 12/2002 | Kendig et al. ............. 423/350 |
| 2003/0147798 | A1 | | 8/2003 | Kirii et al. |
| 2008/0220166 | A1 | * | 9/2008 | Ege et al. ............... 427/255.395 |

FOREIGN PATENT DOCUMENTS

| JP | 11-253741 | 9/1999 |
| JP | 2005-336045 | 12/2005 |
| JP | 2006-169012 | 6/2006 |
| WO | WO-02/12122 | 2/2002 |

OTHER PUBLICATIONS

International Search Report mailed Jan. 22, 2008, issued on PCT/JP2007/070943.
Office Action for Chinese Patent Application 200780028580.3 dated Oct. 28, 2010.

* cited by examiner

*Primary Examiner* — Marc S Zimmer
*Assistant Examiner* — Lindsay Nelson
(74) *Attorney, Agent, or Firm* — Edwards Angell Palmer & Dodge LLP

(57) ABSTRACT

A method for producing polycrystalline silicon, including: reacting trichlorosilane and hydrogen to produce silicon and a remainder including monosilanes (formula: $SiH_nCl_{4-n}$, wherein n is 0 to 4) containing silicon tetrachloride, and a polymer including at least trisilanes or tetrasilanes; and supplying the remainder and hydrogen to a conversion reactor and heating at a temperature within the range of 600 to 1,400° C. to convert silicon tetrachloride into trichlorosilane and the polymer into monosilanes.

9 Claims, 2 Drawing Sheets

METHOD FOR PRODUCING POLYCRYSTALLINE SILICON, AND FACILITY FOR PRODUCING POLYCRYSTALLINE SILICON

TECHNICAL FIELD

The present invention relates to a method for producing polycrystalline silicon which is used as a raw material for growing single-crystal silicon for use in semiconductors, and a facility for producing polycrystalline silicon.

Priority is claimed on Japanese Patent Application No. 2006-308477, filed Nov. 14, 2006, and Japanese Patent Application No. 2007-273546, filed Oct. 22, 2007, the contents of which are incorporated herein by reference in their entirety.

BACKGROUND ART

High purity polycrystalline silicon, which is used as a raw material for single-crystal silicon for use in semiconductors, is generally produced by a process called the "Siemens process". In the Siemens process, polycrystalline silicon is produced by a reduction reaction and thermolysis reaction of trichlorosilane ($SiHCl_3$), as shown by the reaction formulas (1) and (2) below.

$$SiHCl_3 + H_2 \rightarrow Si + 3HCl \qquad (1)$$

$$4SiHCl_3 \rightarrow Si + 3SiCl_4 + 2H_2 \qquad (2)$$

Further, trichlorosilane, which is used as a raw material in the Siemens process, can be produced by reacting silicon tetrachloride ($SiCl_4$:tetrachlorosilane) with hydrogen to effect conversion, as shown by the reaction formula (3) below.

$$SiCl_4 + H_2 \rightarrow SiHCl_3 + HCl \qquad (3)$$

Conventionally, in the production of polycrystalline silicon by the Siemens process, it is known that the generated reaction gas contains monochlorosilane, dichlorosilane and polymeric silicon chloride compounds referred to as "polymer", as well as trichlorosilane and silicon tetrachloride (see Patent Document 1). The above-mentioned polymer is a generic term including high-order silicon compounds (polymeric silicon chloride compounds) having two or more silicon atoms, such as $Si_2Cl_6$, $Si_3Cl_8$ (trisilicon octachloride) and $Si_2H_2Cl_4$.

A residual liquid obtained by distilling the polymer contains trisilicon octachloride ($Si_3Cl_8$), which is a trisilane having three silicon atoms, and tetrasilicon decachloride ($Si_4Cl_{10}$), which is a tetrasilane having four silicon atoms. Conventionally, these silanes were subjected to hydrolysis treatment with water, an alkali, or the like. For example, Patent Document 2 discloses a technique of decomposing the polymer.

[Patent Document 1] International Patent Application Publication No. WO02/012122

[Patent Document 2] Japanese Unexamined Patent Application, First Publication No. Hei 11-253741

DISCLOSURE OF INVENTION

Problems to be Solved by the Invention

In the conventional production of polycrystalline silicon by the Siemens process, the generated polymer is subjected to hydrolysis treatment. However, in the hydrolysis, heat and hydrogen are generated. Therefore, a high level control and facility for dealing with the problem were necessary. Further, as the chlorine component within the polymer reacts with an alkali or the like to be removed, the chlorine source within the plant system is reduced. Therefore, it was necessary to add a chlorine source from outside the plant. Furthermore, as the polymerization degree of silicon increases, the boiling point of silicon becomes higher. As a result, disadvantages are likely to be caused on the integrity of the conduit and apparatuses, such as adhesion of the polymer on the inner wall surface of the conduits, which causes clogging. In particular, it was highly possible that clogging caused by adhesion of trisilanes and tetrasilanes could not be prevented by a typical facility using steam heating.

The present invention takes the above circumstances into consideration, with an object of providing a method for producing polycrystalline silicon and a facility for producing polycrystalline silicon, which enable easy decomposition of the polymer, suppress loss of chlorine source, and maintain integrity of the apparatuses.

Means to Solve the Problems

For solving the above-mentioned problems, the present invention adopts the following aspects. Specifically, the method for producing polycrystalline silicon according to the present invention includes: reacting trichlorosilane and hydrogen to produce silicon and a remainder including monosilanes (formula: $SiH_nCl_{4-n}$, wherein n is 0 to 4) containing silicon tetrachloride, and a polymer including at least trisilanes or tetrasilanes (production step); and supplying the remainder and hydrogen to a conversion reactor and heating at a temperature within the range of 600 to 1,400° C. to convert silicon tetrachloride into trichlorosilane and the polymer into monosilanes (conversion step).

Further, the facility for producing polycrystalline silicon according to the present invention includes: a production reactor for reacting trichlorosilane and hydrogen to produce silicon and a remainder including monosilanes (formula: $SiH_nCl_{4-n}$, wherein n is 0 to 4) containing silicon tetrachloride, and a polymer including at least trisilanes or tetrasilanes; and a conversion reactor to which the remainder and hydrogen are supplied and heated at a temperature within the range of 600 to 1,400° C. to convert silicon tetrachloride into trichlorosilane and the polymer into monosilanes.

In the method for producing polycrystalline silicon and facility for producing polycrystalline silicon according to the present invention, hydrogen and the remainder containing a polymer including at least trisilanes or tetrasilanes are supplied to a conversion reactor and heated at a temperature within the range of 600 to 1,400° C. to convert silicon tetrachloride into trichlorosilane and the polymer into monosilanes. As a result, monosilanes such as trichlorosilane and dichlorosilane, which are raw materials for producing polycrystalline silicon, can be obtained from the polymer within the conversion reactor.

Further, as shown in the configuration example illustrated in FIG. 1, controlling and facility accompanying hydrolysis become unnecessary, and loss of the chlorine source by alkali or the like can be prevented. Furthermore, treatment of the residual polymer becomes unnecessary, and hence, clogging of conduits can be suppressed, and integrity of conduits and apparatuses can be maintained.

In the method for producing polycrystalline silicon according to the present invention, the polymer may be supplied to the conversion reactor so that the concentration of the polymer in the conversion reactor becomes within the range of 0.01 to 1 mol %. Further, in the facility for producing polycrystalline silicon according to the present invention, the polymer may be supplied to the conversion reactor so that the concentration of the polymer in the conversion reactor becomes within the range of 0.01 to 1 mol %.

When the concentration of the polymer in the conversion reactor is less than 0.01 mol %, the amount of the polymer used in the conversion reaction becomes small, as compared to the amount of the polymer generated in the step including reacting trichlorosilane and hydrogen to produce silicon and a remainder including monosilanes (formula: $SiH_nCl_{4-n}$, wherein n is 0 to 4) containing silicon tetrachloride, and a polymer including at least trisilanes or tetrasilanes. As a result, a large portion of the polymer needs to be subjected to hydrolysis treatment, and hence, the effects of the present invention cannot be satisfactorily achieved. On the other hand, when the concentration of the polymer in the conversion reactor exceeds 1 mol %, it becomes highly possible that the polymer is adhered to the inner wall surface near the inlet of the conversion reactor, thereby causing clogging of the conduit.

For the reasons described above, in the method for producing polycrystalline silicon and facility for producing polycrystalline silicon according to the present invention, it is preferable that the polymer be supplied to the conversion reactor so that the concentration of the polymer in the conversion reactor becomes within the range of 0.01 to 1 mol %. When the concentration of the polymer is within the above-mentioned range, monosilanes such as trichlorosilane and dichlorosilane, which are raw materials for producing polycrystalline silicon, can be obtained from the polymer within the conversion reactor. Further, clogging of conduits near the inlet of the conversion reactor can be prevented.

For supplying the polymer to the conversion reactor so that the concentration of the polymer in the conversion reactor becomes within the range of 0.01 to 1 mol %, in the example shown in FIG. 1, the mixing ratio of silicon tetrachloride from the top of the second distillation column to the polymer from the top of the third distillation column can be adjusted.

In the method for producing polycrystalline silicon according to the present invention, a supplying conduit for supplying the polymer to the conversion reactor may be heated at a temperature within the range of 60 to 300° C. Further, the facility for producing polycrystalline silicon according to the present invention may further include a supplying conduit for supplying the polymer to the conversion reactor, and a conduit-heating mechanism for heating the conduit at a temperature within the range of 60 to 300° C.

In the method for producing polycrystalline silicon and facility for producing polycrystalline silicon according to the present invention, by heating a supplying conduit for supplying the polymer to the conversion reactor at a temperature within the range of 60 to 300° C., the polymer can be prevented from being deposited in the conduit at a low temperature to cause clogging. When the heating temperature is lower than 60° C., depositing of the polymer at a low temperature is likely to occur. On the other hand, a heating temperature higher than 300° C. is unfavorable, as the polymer is decomposed by heat.

In the method for producing polycrystalline silicon according to the present invention, for example, the remainder produced in the production step is introduced into a cooler to separate hydrogen and hydrogen chloride from the remainder; the resultant is introduced into a first distillation column to separate trichlorosilane; the column-bottom component of the first distillation column is introduced into a second distillation column to separate silicon tetrachloride; the column-bottom component of the second distillation column is introduced into a third distillation column to separate a polymer; and the polymer separated in the third distillation column and silicon tetrachloride separated in the second distillation column are introduced into the conversion reactor, and hydrogen is further introduced into the conversion reactor, to effect a reaction.

Further, the facility for producing polycrystalline silicon according to the present invention, for example, further includes a cooler for cooling the remainder produced in the production step to separate hydrogen and hydrogen chloride from the remainder; a first distillation column for distilling the resulting cooled generated gas to separate trichlorosilane; a second distillation column for distilling the column-bottom component of the first distillation column to separate silicon tetrachloride; a third distillation column for distilling the column-bottom component of the second distillation column to separate a polymer; and a conversion reactor to which the polymer separated in the third distillation column and silicon tetrachloride separated in the second distillation column are supplied, and hydrogen is further supplied, to effect a conversion reaction.

By the method for producing polycrystalline silicon and facility for producing polycrystalline silicon according to the present invention, the remainder generated in the production step is cooled to separate hydrogen and hydrogen chloride from the remainder, and trichlorosilane and silicon tetrachloride are separated by distillation in a stepwise manner and reused. As a result, disposal loss of these substances can be prevented, and efficiency can be enhanced. Further, with respect to silicon tetrachloride and polymer separated by distillation, as the concentration thereof can be easily adjusted when they are introduced into the conversion reactor to be reused, the efficiency of the conversion reaction can be enhanced.

Effect of the Invention

By the method for producing polycrystalline silicon and facility for producing polycrystalline silicon according to the present invention, hydrogen and the remainder containing a polymer including at least trisilanes or tetrasilanes are supplied to a conversion reactor and heated at a temperature within the range of 600 to 1,400° C. to convert silicon tetrachloride into trichlorosilane and the polymer into monosilanes. Therefore, by the reuse of the polymer, monosilanes, which are raw materials for producing polycrystalline silicon, can be obtained. Further, by adjusting the operation conditions of the third distillation column, a plant for subjecting the polymer to hydrolysis treatment becomes unnecessary, and loss of the chlorine source can be prevented. Furthermore, clogging of conduits caused by deposition of polymer can be suppressed, and integrity of the conduits and apparatuses can be maintained.

DESCRIPTION OF REFERENCE NUMERALS

1. Production reactor
2. Conversion reactor
3. Cooler
4. First distillation column 5. Second distillation column
6. Third distillation column
7. Supplying conduit
8. Supplying conduit-heating mechanism
S1. Polycrystalline silicon production step
S2. Cooling/condensation step
S3. Trichlorosilane distillation/separation step
S4. Silicon tetrachloride distillation/separation step
S5. Polymer distillation/collection step
S6. Conversion step
S7. Residue treatment step

BEST MODE FOR CARRYING OUT THE INVENTION

Hereinbelow, one embodiment of the method for producing polycrystalline silicon and facility for producing polycrystalline silicon according to the present invention will be described with reference to FIGS. 1 and 2.

Figure 1:
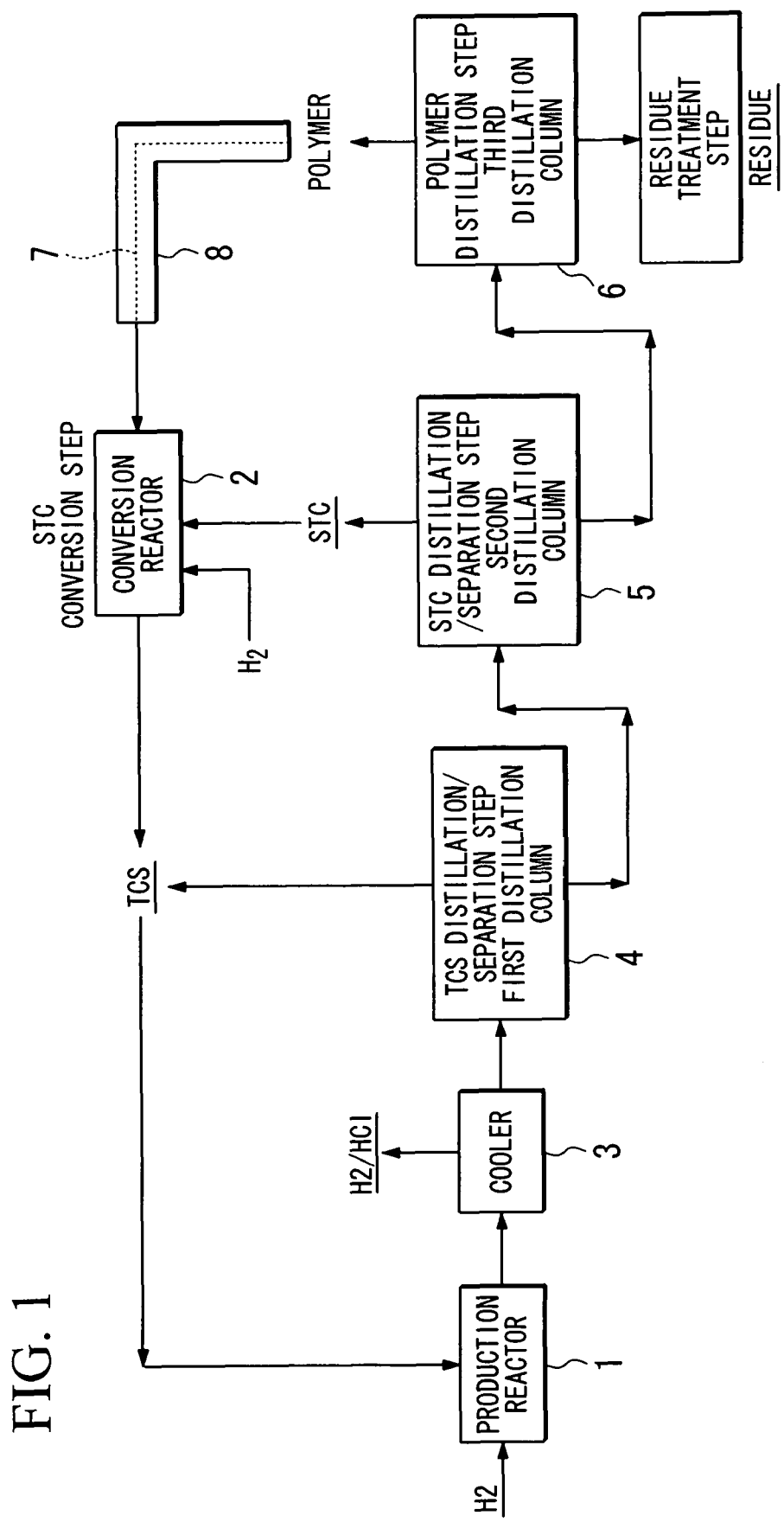
FIG. 1 is a block diagram showing a facility for producing polycrystalline silicon in one embodiment of the method for producing polycrystalline silicon and facility for producing polycrystalline silicon according to the present invention.
Figure 2:
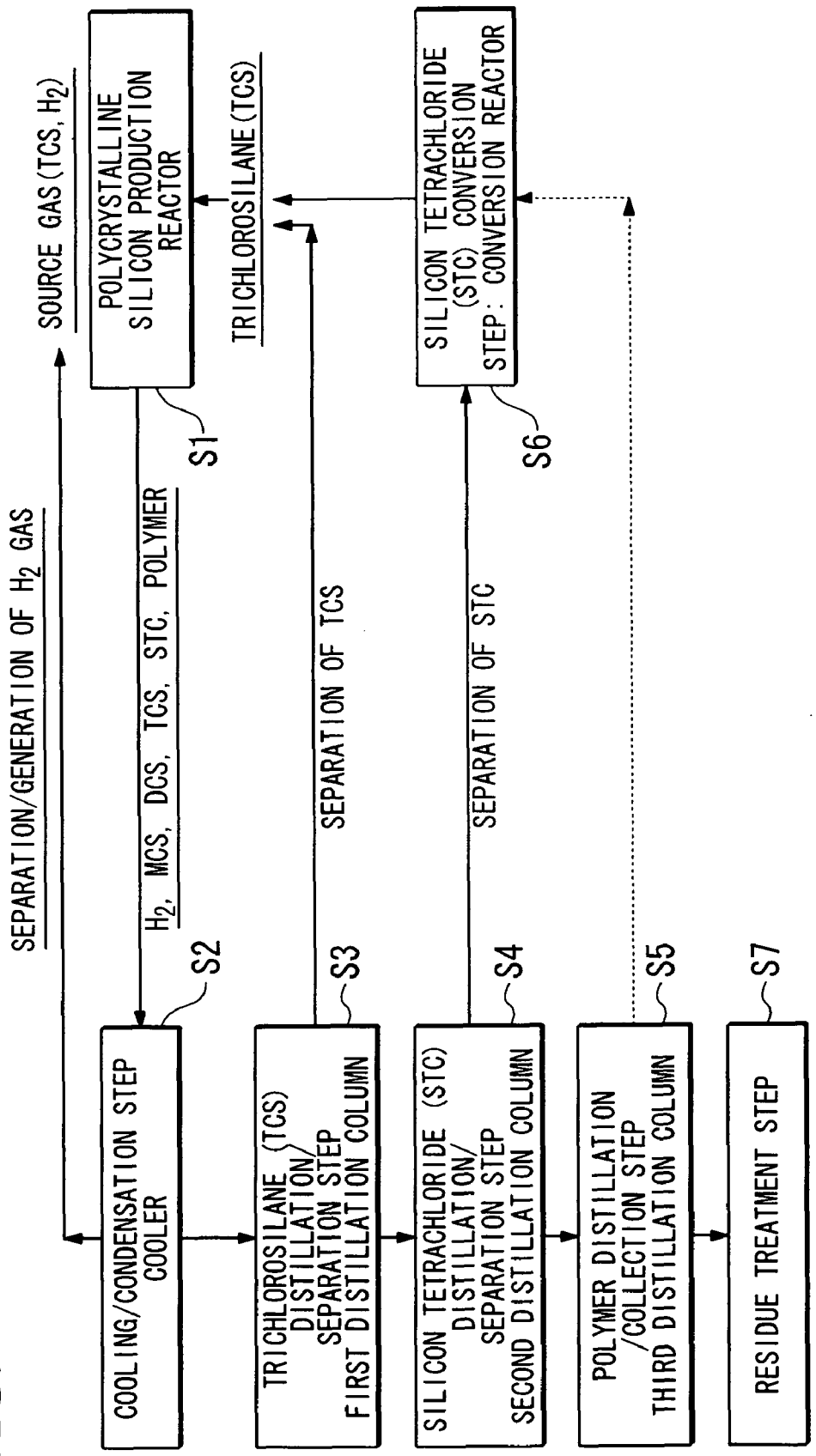
FIG. 2 is a flow chart showing the method for producing polycrystalline silicon according to the present embodiment.

As shown in FIG. 1, a facility for producing polycrystalline silicon (polycrystalline silicon production facility) according to the present embodiment is provided with a production reactor 1 for reacting trichlorosilane and hydrogen to produce silicon and a remainder including monosilanes (formula: $SiH_nCl_{4-n}$, wherein n is 0 to 4) containing silicon tetrachloride, and a polymer including at least trisilanes or tetrasilanes; and a conversion reactor 2 to which the remainder and hydrogen are supplied and heated at a temperature within the range of 600 to 1,400° C. to convert silicon tetrachloride into trichlorosilane and the polymer into monosilanes.

Further, the polycrystalline silicon production facility is provided with a cooler 3 which is a condenser for cooling the remainder discharged from the production reactor 1, a first distillation column 4, a second distillation column 5, and a third distillation column 6. In the cooler 3, hydrogen and hydrogen chloride are separated from the remainder and purified, and chlorosilanes and polymer are condensed, collected and separated. In the first distillation column 4, trichlorosilane is distilled and separated from the remainder separated in the cooler 3. In the second distillation column 5, silicon tetrachloride is distilled and separated from the remainder having trichlorosilane separated in the first distillation column 4. In the third distillation column 6, a polymer is distilled and separated from the remainder having silicon tetrachloride separated therefrom in the second distillation column 5.

The third distillation column 6 is connected to the conversion reactor 2 by a supplying conduit 7 for supplying the polymer separated in the third distillation column 6 to the conversion reactor 2. Further, a supplying conduit-heating mechanism 8 for heating the supplying conduit 7 at a temperature within the range of 60 to 300° C. is provided.

The amount of the polymer supplied from the supplying conduit 7 to the conversion reactor 2 is controlled so that the amount of the polymer in the conversion reactor becomes within the range of 0.01 to 1 mol %. Further, the conversion reactor has a hydrogen supplying conduit connected thereto.

The production reactor 1 is a reaction furnace for producing polycrystalline silicon by the Siemens process. In the production reactor 1, a mixed gas of trichlorosilane and hydrogen is used as a raw material (source gas), and the mixed gas is heated inside the production reactor to effect a thermolysis reaction and a hydrogen reduction reaction to generate silicon crystals. The generated silicon crystals are deposited on the surface of a red-hot silicon rod provided within the production reactor, thereby growing a polycrystalline silicon rod having a thick diameter. In this manner, polycrystalline silicon is produced in the production reactor 1. A part of hydrogen for the source gas is hydrogen separated from the cooler 3 and purified to be reused.

The conversion reactor 2 is a conversion furnace in which silicon tetrachloride supplied from the second distillation column 5 and hydrogen are introduced and heated at a temperature of 600 to 1,400° C., preferably 800° C. or higher, more preferably higher than 1,200° C. to effect a conversion reaction, thereby generating a reaction gas of trichlorosilane and hydrogen chloride. In the present embodiment, in addition to silicon tetrachloride and hydrogen, the polymer supplied from the supply conduit 7 is also introduced and subjected to the reaction. When the conversion reaction temperature is lower than 600° C., the conversion reaction cannot satisfactorily proceed. On the other hand, when the conversion reaction temperature is higher than 1,400° C., a disadvantage is caused in that the SiC coating provided on the carbon members constituting the conversion reactor is delaminated.

The supplying conduit-heating mechanism 8 heats the supplying conduit 7 within the above-mentioned temperature range by, for example, steam heating, electric heating or gas combustion heating.

Next, the method for producing polycrystalline silicon using the facility for producing polycrystalline silicon according to the present embodiment will be described, with reference to FIG. 2.

Firstly, trichlorosilane and hydrogen are supplied to and reacted in the production reactor 1 (polycrystalline silicon production step: S1), and the generated remainder is transferred to the cooler 3 to separate and purify hydrogen and hydrogen chloride from the remainder (cooling/condensation step: S2). The remainder having hydrogen and the like separated therefrom in the cooler 3 is transferred to the first distillation column 4, and trichlorosilane (boiling point: 33° C.) is distilled and separated (trichlorosilane (TCS) distillation/separation step: S3).

In the first distillation column 4, the column top temperature is set at the distillation temperature of trichlorosilane, and trichlorosilane distilled off is collected. Since silicon tetrachloride has a boiling point higher than trichlorosilane, in this distillation step, silicon tetrachloride is discharged from the bottom of the column with other remainders.

Subsequently, the remainder having trichlorosilane separated therefrom in the first distillation column 4 is transferred to the second distillation column 5, and silicon tetrachloride (boiling point: about 57° C.) is distilled and separated (silicon tetrachloride (STC) distillation/separation step: S4). In the second distillation column 5, the column top temperature is set at the distillation temperature of silicon tetrachloride, and silicon tetrachloride distilled off is collected. In this distillation step, silicon tetrachloride is distilled off, while silicon tetrachloride containing a high-boiling point polymer remains in the liquid component.

The remainder at the bottom of the second distillation column 5 having silicon tetrachloride separated therefrom is introduced into the third distillation column 6. In the third distillation column 6, a liquid containing silicon tetrachloride and the polymer is separated, namely, silicon tetrachloride containing a small amount of the polymer is distilled off from the column top, and silicon tetrachloride containing a large amount of the polymer is separated from the bottom of the column (polymer distillation/collection step: S5). The column-top component (the polymer-containing silicon tetrachloride) is introduced to the conversion reactor 2 via the supplying conduit 7. On the other hand, the column-bottom remainder (silicon tetrachloride containing a large amount of polymer) is subjected to hydrolysis treatment or the like in the residue treatment step.

The concentration of the polymer within silicon tetrachloride can be adjusted by changing the operation conditions of the distillation column. By adjusting the operation conditions of the third distillation column 6, and adjusting the ratio of the column top component of the second distillation column 5 (silicon tetrachloride) to the column top component of the third distillation column 6 (polymer-containing silicon tetrachloride), the polymer concentration in the conversion reactor can be adjusted within the range of 0.01 to 1 mol %.

In the third distillation column 6, distillation is performed at a temperature in the range of 60 to 300° C. The polymer separated in the third distillation column 6 contains $Si_2H_2Cl_4$, $Si_2Cl_6$, trisilanes, and the like. Among these, $Si_2Cl_6$ can be collected a as a raw material for semiconductors. Among trisilanes, $Si_3Cl_8$ has the highest boiling point of 212° C.

The separated polymer is introduced into the conversion reactor 2 via the supplying conduit 7. The amount of the polymer supplied to the conversion reactor 2 is adjusted so that the concentration of the polymer in the conversion reactor becomes within the range of 0.01 to 1 mol %. When all of the disilanes such as $Si_2Cl_6$ are collected as a raw material for semiconductors, and only 25% of the remaining trisilanes are charged into the conversion reactor, about 0.01 mol % of the polymer can be obtained. When all of the disilanes and other polymers are charged into the conversion reactor 2, and about 25% of silicon tetrachloride is consumed for the conversion, 1 mol % of the polymer can be obtained. In this manner, the concentration of the polymer can be adjusted by the yield of substance in the polycrystalline silicon production step.

Further, during the supplying of the polymer, the supplying conduit 7 is heated to a temperature within the range of 60 to 300° C. by the supplying-conduit heating mechanism 8. Furthermore, silicon tetrachloride distilled off at the second distillation column 5 is also supplied to the conversion reactor 2 as a part of raw materials.

In the conversion reactor 2, trichlorosilane is produced by the conversion reaction of silicon tetrachloride and hydrogen, and monosilanes such as trichlorosilane (TCS) and dichlorosilane (DCS) are generated by the conversion reaction of the polymer (conversion step: S6). By virtue of introducing the polymer containing trisilanes into the conversion reactor 2, the chlorine source can be effectively used, and the amount of monosilanes (dichlorosilane and trichlorosilane) contributing to the production of polycrystalline silicon can be increased.

The reaction gas containing monosilanes such as trichlorosilane generated in the conversion reactor 2 is transferred to the production reactor 1, and subjected to the production reaction of polycrystalline silicon. On the other hand, the residue having the polymer separated therefrom in the third distillation column 6 is, for example, separately subjected to the residue treatment step (S7).

As described above, in the present embodiment, hydrogen and the remainder containing a polymer including at least trisilanes or tetrasilanes are supplied to the conversion reactor 2 and heated at a temperature within the range of 600 to 1,400° C. to convert silicon tetrachloride into trichlorosilane and the polymer into monosilanes. As a result, monosilanes such as trichlorosilane and dichlorosilane, which are raw materials for producing polycrystalline silicon, can be obtained from the polymer within the conversion reactor 2.

Further, controlling and facility accompanying hydrolysis become unnecessary, and loss of the chlorine source by alkali or the like can be prevented. Furthermore, treatment of the residual polymer becomes unnecessary, and hence, clogging of conduits can be suppressed, and integrity of conduits and apparatuses can be maintained. Especially, by heating the supplying conduit 7 for supplying the polymer to the conversion reactor 2 to a temperature within the range of 60 to 300° C., the polymer can be prevented from being deposited in the supplying conduit 7 at a low temperature to cause clogging. Further, by supplying the polymer to the conversion reactor 2 in the range of 0.01 to 1 mol %, hydrolysis treatment becomes unnecessary, and clogging of the conduits near the inlet of the conversion reactor 2 can be prevented.

EXAMPLES

Next, polycrystalline silicon is actually produced by the facility for producing polycrystalline silicon according to the above-described embodiment, and the decomposition treatment of the polymer will be specifically described, with reference to the following examples and comparative examples. The scope of the present invention is by no way limited by the above-described embodiment and following examples, and various modifications can be made without departing from the spirit of the present invention.

Example 1

A liquid obtained by condensing the remainder from the production reactor 1 in the cooler 3 had the following composition: $SiH_2Cl_2$: 3%, $SiHCl_3$: 50%, $SiCl_4$: 43%, polymer: 2%. This remainder was subjected to each of the above-described distillation steps, and introduced into the conversion reactor 2 so that the amount of the polymer supplied became 0.01 mol %. The temperature of the conversion reactor 2 was set at 1,300° C., and the flow rates of the liquid and hydrogen were set at 40 L/min and 16 m³/min, respectively. Further, the temperature of the supplying conduit 7 was set at 230° C. Under the above-described conditions, the conversion ratio of $SiCl_4$ to $SiHCl_3$ was 20% and the decomposition ratio of the polymer was 90% or more, which were excellent results.

Examples 2 and 3

The remainder was subjected to each of the above-described distillation steps and introduced into the conversion reactor 2 in substantially the same manner as in Example 1, except that the amount of polymer supplied was changed as indicated in Table 1. The results are shown in Table 1.

Comparative Examples 1 and 2

The remainder was subjected to each of the above-described distillation steps and introduced into the conversion reactor 2 in substantially the same manner as in Example 1, except that the amount of polymer supplied was changed as indicated in Table 1. The results are shown in Table 1.

TABLE 1

| No. | Amount of polymer supplied | Decomposition ratio of polymer | TCS conversion ratio | Conduit temperature | Remarks |
|---|---|---|---|---|---|
| 1 | 0.0 mol % | — | 20% | 60° C.-300° C. | |
| 2 | 0.01 mol % | >90% | 20% | | |
| 3 | 0.05 mol % | >98% | 21% | | |
| 4 | 1.0 mol % | >99% | 21% | | |
| 5 | 2.0 mol % | >99% | 20% | | Clogging of conduit was observed |

In Table 1, Nos. 1 and 5 indicate Comparative Examples, and Nos. 2 to 4 indicate Examples. The decomposition ratio of the polymer was determined as ((number of moles of the polymer prior to conversion reaction)−(number of moles of the polymer after conversion reaction))/(number of moles of the polymer prior to conversion reaction). The TCS conversion ratio is the conversion ratio of $SiCl_4$ to $SiCl_3$, and the conduit temperature is the temperature of the supplying conduit 7.

The invention claimed is:

1. A method for producing polycrystalline silicon, comprising:

reacting trichlorosilane and hydrogen to produce polycrystalline silicon and a remainder comprising monosilanes, formula: $SiH_nCl_{4-n}$, wherein n is 0 to 4, containing silicon tetrachloride, and a polymer including at least trisilanes or tetrasilanes;

depositing the polycrystalline silicon on a surface of a red-hot silicon rod, and supplying said remainder and hydrogen to a conversion reactor and heating at a temperature within the range of 600 to 1,400° C. to convert silicon tetrachloride into trichlorosilane and said polymer into monosilanes, wherein said remainder produced by reacting trichlorosilane and hydrogen is introduced into a cooler to separate hydrogen and hydrogen chloride from said remainder; the resultant is introduced into a first distillation column to separate trichlorosilane; the column-bottom component of the first distillation column is introduced into a second distillation column to separate silicon tetrachloride; the column-bottom component of the second distillation column is introduced into a third distillation column to separate a polymer; and the polymer separated in the third distillation column and silicon tetrachloride separated in the second distillation column are introduced into the conversion reactor, and hydrogen is further introduced into the conversion reactor, to effect a reaction.

2. The method for producing polycrystalline silicon according to claim 1, wherein said polymer is supplied to said conversion reactor so that the concentration of said polymer in said conversion reactor becomes within the range of 0.01 to 1 mol %.

3. The method for producing polycrystalline silicon according to claim 1, wherein a supplying conduit for supplying said polymer to said conversion reactor is heated at a temperature within the range of 60 to 300° C.

4. A facility for producing polycrystalline silicon, comprising:

a production reactor for reacting trichlorosilane and hydrogen to produce polycrystalline silicon and a remainder comprising monosilanes, formula: $SiH_nCl_{4-n}$, wherein n is 0 to 4, containing silicon tetrachloride, and a polymer including at least trisilanes or tetrasilanes;

a silicon rod on which polycrystalline silicon are deposited;

a conversion reactor to which said remainder and hydrogen are supplied and heated at a temperature within the range of 600 to 1,400° C. to convert silicon tetrachloride into trichlorosilane and said polymer into monosilanes, a cooler for cooling said remainder produced by reacting trichlorosilane and hydrogen to separate hydrogen and hydrogen chloride from said remainder;

a first distillation column for distilling the resulting cooled generated gas to separate trichlorosilane;

a second distillation column for distilling the column-bottom component of the first distillation column to separate silicon tetrachloride;

a third distillation column for distilling the column-bottom component of the second distillation column to separate a polymer; and a conversion reactor to which the polymer separated in the third distillation column and silicon tetrachloride separated in the second distillation column are supplied, and hydrogen is further supplied, to effect a conversion reaction.

5. The facility for producing polycrystalline silicon according to claim 4, wherein said polymer is supplied to said conversion reactor so that the concentration of said polymer in said conversion reactor becomes within the range of 0.01 to 1 mol %.

6. The facility for producing polycrystalline silicon according to claim 4, which further comprises a supplying conduit for supplying said polymer to said conversion reactor, and a conduit-heating mechanism for heating said conduit at a temperature within the range of 60 to 300° C.

7. The method for producing polycrystalline silicon according to claim 2, wherein a supplying conduit for supplying said polymer to said conversion reactor is heated at a temperature within the range of 60 to 300° C.

8. The facility for producing polycrystalline silicon according to claim 5, which further comprises a supplying conduit for supplying said polymer to said conversion reactor, and a conduit-heating mechanism for heating said conduit at a temperature within the range of 60 to 300° C.

9. The method for producing polycrystalline silicon according to claim 1, wherein silicon tetrachloride is converted into trichlorosilane by a reaction represented by the following formula: $SiCl_4 + H_2 \rightarrow SiHCl_3 + HCl$.

* * * * *